(12) United States Patent
Vayntraub et al.

(10) Patent No.: US 6,244,709 B1
(45) Date of Patent: Jun. 12, 2001

(54) MULTIFOCAL LENS ARTICLE

(75) Inventors: Michael M. Vayntraub, Rochester, NY (US); Richard R. Martin, Ada, MI (US)

(73) Assignees: Bausch & Lomb Incorporated, Rochester, NY (US); Rotsana Investments LLC, Grand Rapids, MI (US)

( * ) Notice: Subject to any disclaimer, the term of this patent is extended or adjusted under 35 U.S.C. 154(b) by 0 days.

(21) Appl. No.: 09/522,512

(22) Filed: Mar. 10, 2000

Related U.S. Application Data

(60) Provisional application No. 60/124,059, filed on Mar. 12, 1999.

(51) Int. Cl.$^7$ ............................................. G02C 7/04
(52) U.S. Cl. ................................................. 351/161
(58) Field of Search ........................... 351/161, 160 R, 351/160 H, 162

(56) References Cited

U.S. PATENT DOCUMENTS

| | | |
|---|---|---|
| 2,544,246 | 3/1951 | Butterfield ................. 351/160 R |
| 4,525,043 | 6/1985 | Bronstein .................. 351/160 R |
| 4,765,728 * | 8/1988 | Porat et al. ............... 351/160 R |
| 4,883,550 | 11/1989 | Overath et al. ............... 156/171 |
| 5,436,678 | 7/1995 | Carroll ........................ 351/161 |
| 5,502,517 * | 3/1996 | Anan et al. ................ 351/160 H |
| 5,715,031 * | 2/1998 | Roffman et al. ............... 351/161 |
| 5,798,816 | 8/1998 | Martin et al. .............. 351/160 R |
| 5,798,817 | 8/1998 | de Carle ....................... 351/161 |
| 5,835,187 | 11/1998 | Martin ......................... 351/161 |

OTHER PUBLICATIONS

International Search Report Application No. PCT/US 00/06387 Dated Jul. 6, 2000.

* cited by examiner

Primary Examiner—Jordan M. Schwartz
(74) Attorney, Agent, or Firm—John E. Thomas

(57) ABSTRACT

The present invention is directed toward a multifocal contact lens having an improved front-surface lens design, which design can be used either as a stand-alone multifocal design for both distance- and near-vision correction or, in combination with a back-surface multifocal design, as a means to provide additional power for near-vision correction. In one embodiment of the invention, the contact lens has a front surface comprising a central elliptical curve, a mid-peripheral polynomial curve, and a lenticular spherical curve.

18 Claims, 2 Drawing Sheets

MULTIFOCAL LENS ARTICLE

This application claims the benefit under 35 USC 119(e) of prior provisional application Ser. No. 60/124,059, filed Mar. 12, 1999.

FIELD OF THE INVENTION

The present invention is directed toward an improved lens design. In particular, the lens design is directed to a multifocal lens for correcting the vision defects of presbyopes.

BACKGROUND

Rigid-gas-permeable contact lenses, i.e., "RGP" lenses have been available for many years. Many lens designs have been suggested for RGP lenses. Generally, the lenses include one or more concave curves on the posterior (back or ocular) surface of the lens and one or more convex curves on the anterior (front) surface. The curves may be spherical or aspherical. See, for example, U.S. Pat. No. 2,544,246 to Butterfield for a spherically curved lens and U.S. Pat. No. 4,883,350 to Muckenhirn for an aspherically curved lens design.

Although the vast majority of lenses currently prescribed are single vision lenses, there is an increasing interest in bifocal or multifocal contact lenses for persons with presbyopia ("presbyopes"), due to an aging population. This will result in increasing numbers of presbyopes, since everyone becomes presbyopic with age. Presbyopia is a gradual lessening of the power of accommodation due to a physiological change that first becomes noticeable about the age of 40 years. Accommodation refers to adjustment by the eye for seeing at different distances, which accommodation is accomplished by changing the shape of the crystalline lens within the eye through the action of the ciliary muscle which are attached to opposite longitudinal ends of the crystalline lens. Accommodative ability is believed to decrease with age because of the loss of strength of the ciliary muscle and/or hardening of the lens. The primary feature of presbyopia is the inability to do close work. Myopic (near-sighted) persons who develop presbyopia will, therefore, eventually need both near-vision and distance-vision correction. Multifocal lenses correct for both near- and distance-vision for presbyopes. Such lenses are also suited for patients with aphakia, accommodative convergence defects, and the like.

Existing multifocal lenses can be broadly categorized as having either simultaneous or alternating designs. An alternating design requires lens translation to present the eye alternatively with distance- and near-lens segments of the lens. A simultaneous design does not require lens translation but rather involves focusing both the distance and the near images at the same time. For example, one concentric simultaneous design has a circular near segment surrounded by an annular distance segment (center-near) or the reverse (center-distance). U.S. Pat. No. 5,798,817 to de Carle discloses a plurality of such concentric near-vision and distance-vision zones.

Aspheric multifocal lenses are a type of concentric simultaneous lens having one or more aspheric curves from the center to the edge of the lens. An aspheric curve may be on the posterior (ocular) side of the lens or on the anterior side of the lens, or both. A commercially successful, simultaneous, concentric multifocal lens with a posterior aspheric design is the Boston MultiVision® lens, which is based on the design disclosed in U.S. Pat. No. 5,436,678 to Carroll. This lens is designed to reduce de-centering of the lens on the eye and to minimize the variability of performance caused by varying pupil sizes. The lens is described as comprising a central zone, a marginal zone, and a peripheral zone, wherein the axial lift of the central and marginal zones increase towards the edge of the lens and the axial lift of the peripheral zone decreases toward the edge of the lens.

Clinical experience has proven the Boston MultiVision® lens design to be especially advantageous, in terms of performance and comfort, for presbyopic contact-lens wearers, especially for relatively early presbyopes. For more advanced presbyopes, however, it would be desirable to have a lens that is specifically designed for providing greater refractive correction than typically provided by the Boston MultiVision® lens. In particular, it would be desirable to increase the near-vision correction of the latter lens without sacrificing the performance of the lens, including its already excellent visual acuity, distance correction and comfort. Finally, irrespective of use with the Boston MultiVision® lens, it would be desirable to provide an improved design for the anterior surface of multifocal lens in general, either as a stand-alone for vision correction or to provide additional power to the posterior surface of the lens.

SUMMARY OF THE INVENTION

The present invention is directed to a multifocal lens having an improved lens design for the front surface of the lens. The design can be used in a multifocal lens either as a stand-alone to provide multifocal vision correction or, in combination with a back-surface multifocal design, to provide additional lens power, primarily for the near-vision portion of the multifocal lens. In one particular embodiment, the present design for the front surface of a multifocal lens can be used to significantly improve the available range of power correction for the multifocal lens disclosed in U.S. Pat. No. 5,436,678 to Carroll, so that it is better adapted for, not only early presbyopes, but also persons in the later stages of presbyopia.

DETAILED DESCRIPTION OF THE INVENTION

As indicated above, the present invention is directed to an improved design for a multifocal lens article. The term "article," as used herein, is intended to include both contact lenses and buttons or blanks from which contact lenses are produced, so long as the buttons or blanks embody at least part of the final lens design, for example the front surface design. The term "button," as used herein, refers to stock material from which the final and complete lens surfaces are cut, typically by way of a lathe. However, although the "articles" of the present invention include buttons, the invention is not limited to lenses produced from buttons, but includes lenses either lathed or molded.

Figure 1:
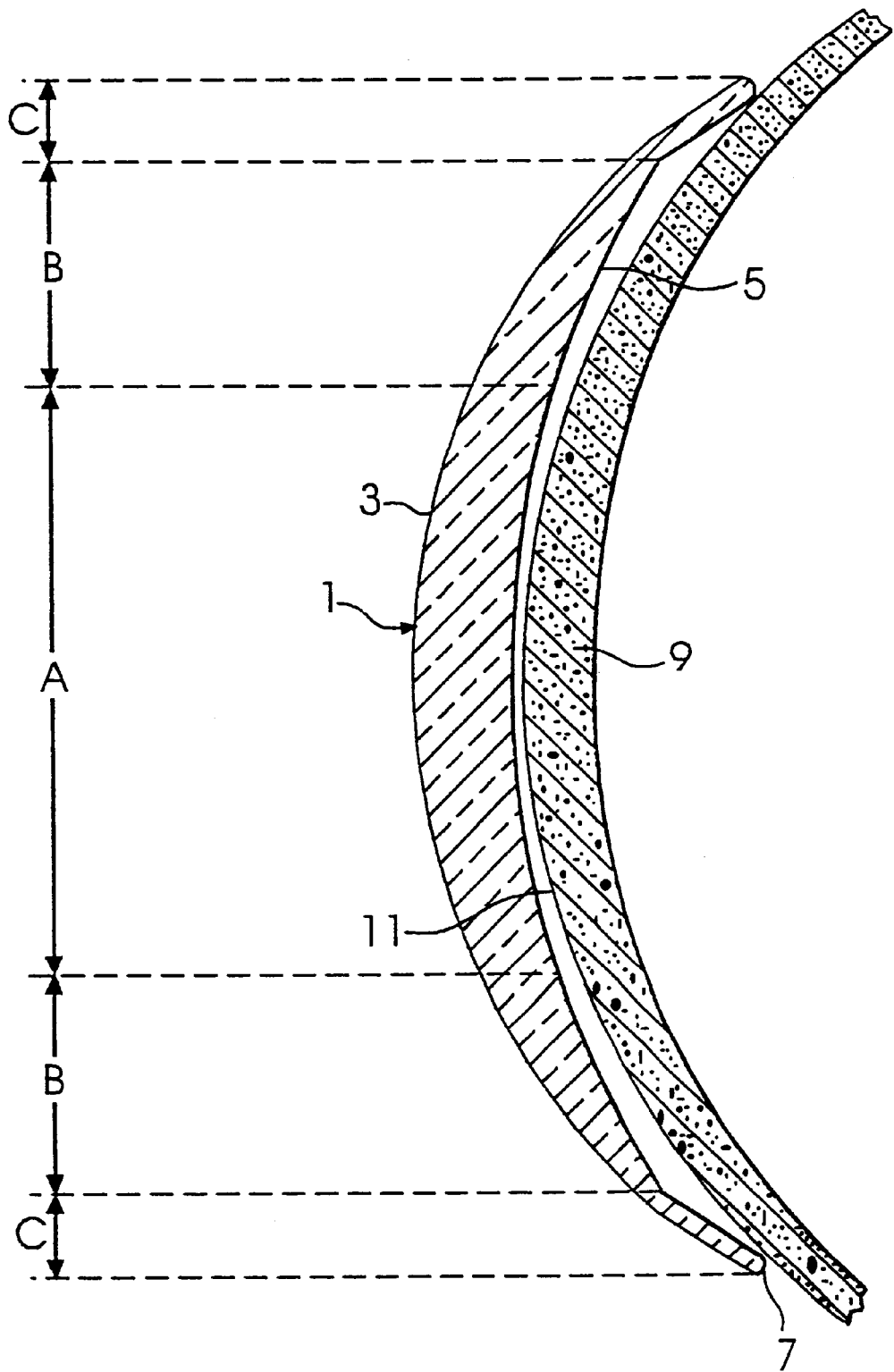
FIG. 1 (Prior Art) is an enlarged cross-section schematically showing the fit between a cornea and a generalized multifocal lens, including the central zone, marginal zone, and peripheral zone of the back surface of the lens.

A lens design comprises a plurality of curves on the lens surface along the diameter of a lens. Typically, each "curve" (or interval) is defined by a mathematical equation that can be formed by lathing or its equivalent. Such curves may be differentiated from curves produced by polishing and curves that are "blends" or "fillet curves" (described below) which are produced to join curves in a junctionless manner. Since the lens is typically rotationally symmetrical, the lens design or shape may usually be completely defined by a two-dimensional curve along a cross-sectional radius of the lens. Referring to FIG. 1 (Prior Art), a schematic cross-section of a generalized multifocal lens (1) is shown comprising a front surface (3), a back surface (5), and an edge (7). As shown in FIG. 1, moving in the direction from the axial center of the lens to the outside edge of the lens, three (3) zones on the back surface of the lens can be defined, each of which can include one or more curves. A back central zone (A), shown in terms of its corresponding span in FIG. 1, is within a central optical zone of the lens. The central optical zone is that portion of the lens through which the wearer actually sees, and hence should cover the pupil of the eye through which a person sees (and through which the retina receives an image). The central optical zone generally corresponds in span to the central corneal cap of the cornea. The primary object of the central optical zone is to provide refractive correction for the eye. Since the present invention is directed to a simultaneous multifocal lens, there must be one or more curves (on either the front or back surface or both) within the central optical zone that provides for both near- and distance-vision correction. A back peripheral zone (C) between the back central zone and the edge of the lens, is the area outside the central optical zone and corresponds to the area of the cornea surrounding the corneal cap and extending to the limbus (the junction of the cornea and the sclera of the eye). The primary object of this area is to provide comfort and fit, particularly on the ocular side of the lens. Like the back optical zone, the back peripheral zone can consist of one curve or a series of curves joined together. A zone corresponding to a single curve dividing the back central zone and the back peripheral zone may be referred to as the back marginal zone (C). The back marginal zone may contain a curve that is only partially within the central optical zone, but may clinically contribute to vision correction to at least some extent (which contribution may depend to some extent on lens movement). If clinically contributing to vision correction, the back marginal zone may be considered part of the effective optical zone.

In general, surface curves may be spheric or non-spheric, including but not limited to conical shapes. As is common with respect to RGP lens design, the total diameter ($D_o$) of the lens will typically range from 8 to 11 mm, more typically 9 to 10 mm. The central optical zone will typically range from about 5 to about 8 mm in diameter. The portion of the lens outside the central optical zone (the "peripheral section" of a lens) will typically have a width in the range of about 0.5 to 4 mm. Preferably, the edge thickness will range from about 0.08 to 0.16 mm.

Adjacent curves on a lens surface are typically separated by what is referred to as a "blend" or "fillet curve," which is a "point" of transition (of relatively short dimension) between the radii of curvature (or other curve definition) from one curve to another. Preferably, such a blend is "junctionless," meaning that the blend provides a point of tangency between adjacent curves.

As indicated above, the present invention provides a multifocal lens design for the front surface of a lens article that can provide stand-alone multifocal vision or which can provide additional near-power correction, or both additional distance-power and near-power correction, to a back multifocal surface. In the latter case, the front surface according to the present invention has been found to be especially advantageous in combination with the back multifocal surface generally disclosed in U.S. Pat. No. 5,436,678 to Carroll. The Carroll patent discloses a lens design for the ocular surface of the lens, which design comprises a central zone, a marginal zone and a peripheral zone, each of the zones constituting or comprising portions of second order surfaces of revolution other than spherical, wherein the axial lift of the central and marginal zones increase towards the edge of the lens and the axial lift of the peripheral zone decreases toward the edge of the lens.

The term "axial lift," as used herein, is the absolute value of the axial distance (measured parallel to the lens axis), at a specific diameter of the lens less than $D_o$, between a point on the back surface of a lens and a vertex sphere, the vertex sphere being a theoretical sphere having a radius of curvature equal to that at the direct geometric center of the lens. At $D_o$ the term "edge lift." is applied instead of axial lift. Although the terms "axial lift" and "clearance" are sometimes used interchangeably, the latter term is better employed to refer to the axial distance between a point on the back surface of the lens and a point on the corneal surface.

In one embodiment of the invention, the lens design in commonly assigned U.S. Pat. No. 5,436,678 (which is hereby incorporated by reference in its entirety), comprises a back central zone that preferably has a curve defined by an ellipsoid surface of revolution, a back peripheral zone that preferably has a curve defined by a hyperboloid or ellipsoid surface of revolution, more preferably the latter, and a back marginal zone that preferably has curve defined by a hyperboloid of revolution.

Clinical experience has confirmed that it is advantageous to limit the posterior (ocular) surface of a back multifocal surface (for example, but not limited to, the back surface disclosed by Carroll) to a maximum near- correction of about plus 0.5 to 2 Diopters, preferably about 1 to 2 Diopters. Thus, rather than providing additional power ("add-power") to the ocular side of the lens, which add-power may be needed for later or relatively advanced presbyopic patients, add-power is provided on the anterior side of the lens. By the term "add-power" is meant the difference in power between the near- and distance-power. In particular, it has been found advantageous to provide additional power or correction, on the anterior surface of the lens, in the amount of about 0.25 to 2.00 Diopters, preferably 0.5 to about 0.75, for use in combination with the back-surface multifocal near-vision correction. One advantage of such a design, particularly in the case of a back surface according to the Carroll patent, is that the new front-surface design provides add-power for more advanced presbyopic patients, while maintaining the comfort and visual acuity of the conventional, back multifocal surface disclosed in the Carroll patent, and also without sacrificing the quality or performance of the distance-power correction of the lens. The front surface design of the present invention can also be used to provide limited add-power to a standard or conventional RGP back surface.

Figure 2:
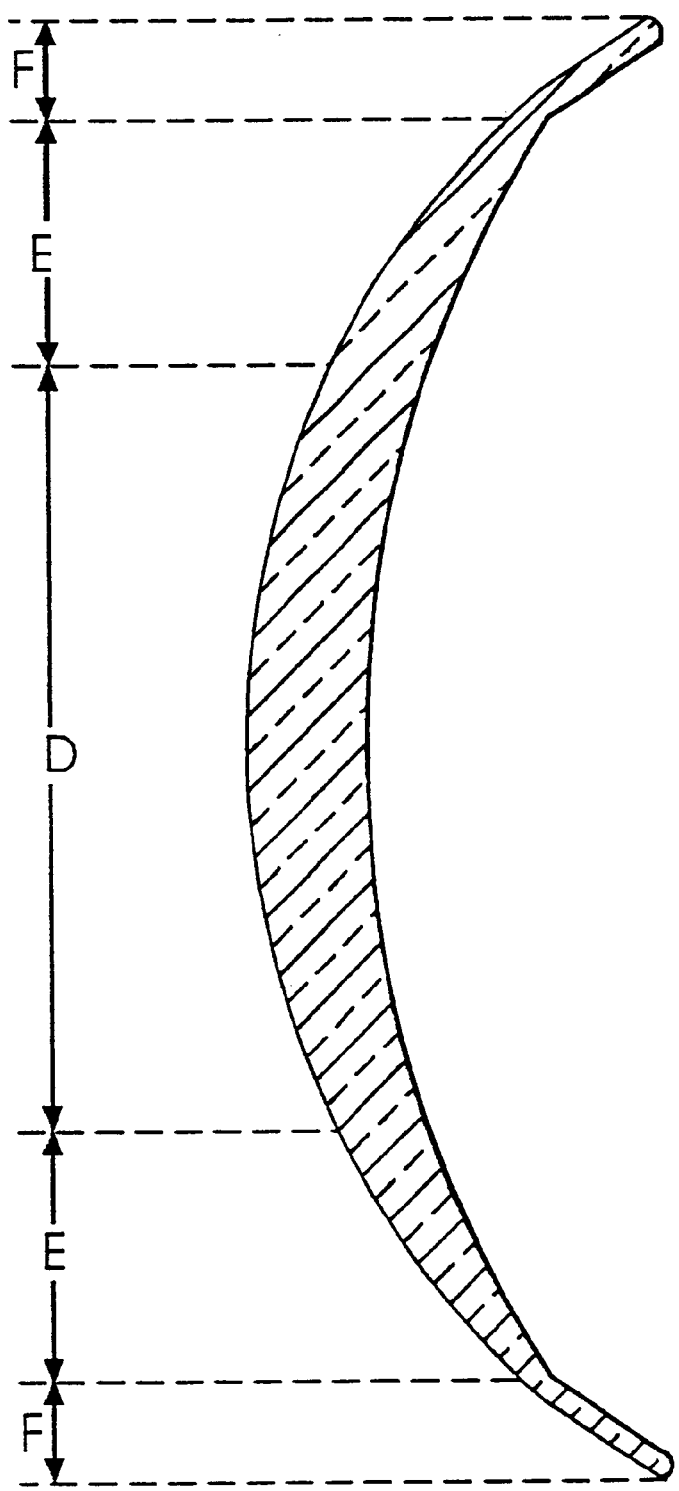
FIG. 2 is an enlarged cross-section schematically showing the zones of the front surface of a lens according to one embodiment of the present invention.

Referring now to FIG. 2, a lens according to one embodiment of the invention is shown, which lens may the back-surface design shown in FIG. 1 and which may have a front-surface design for provide add-power entirely or mostly in favor of near-vision correction. The anterior (front) side of the lens in FIG. 2 comprises a central-most curve within a front central zone (D), a so-called anterior central curve. The anterior side further comprises at least one curve on the front surface in a front peripheral zone (F), which curve may be spherical or aspherical (preferably spherical). Finally, there is a curve within the front marginal zone (E) bridging the anterior central curve with a curve in the peripheral zone (F). This curve on the front surface within the marginal zone shall be referred to as the mid-peripheral curve. In the embodiment of FIG. 2, therefore, the minimum number of curves on the front surface of the lens is three (3), and likewise the minimum number of blends is two (2) on the front surface, each blend separating two (2) curves. It is noted that, although in accordance with a lens according to both the back-surface design of FIG. 1 and the front-surface design of FIG. 2, there may be three (3) curves on each side of the lens corresponding to each of three (3) zones, a curve on the front within, for example, the front central zone, may not correspond exactly in diameter to a curve on the back within the back central optical zone. Similarly, for a two (2) curves corresponding to front and back marginal zones, etc.

In the embodiment of FIG. 2, the distance-power is provided on the front surface of the lens by the anterior central curve, within the front central zone (D). In a particularly preferred embodiment, the anterior central curve is ellipsoidal. As is known to the skilled artisan, an ellipse is a conic section having an eccentricity between 1 and 0, whereas a sphere is a conic section with an eccentricity of zero (e=0) and a hyperbola is a conic section with an eccentricity greater than 1. The generatrix of a conic section such as an ellipse is given by the following equation:

$$Z = \frac{(C)(X^2)}{1 + \sqrt{1 - (1-K)C^2 X^2}}$$

wherein Z is the saggital depth, X is the half diameter, C is $1/R_o$ (wherein $R_o$ is the base curve radius of the central optical zone, and K is $(-e^2)$. Similar equations can be used to describe other conic sections such as a sphere or hyperboloid of revolution.

In addition to what may be provided by the anterior central curve (at least by a peripheral portion of the curve), additional near-power can also be provided on the front surface of the lens by the mid-peripheral curve. The mid-peripheral curve can provide additional near-power by exhibiting increasing axial lift, which axial lift is defined in terms of its absolute value. A preferred mid-peripheral curve is defined by a polynomial, preferably by a third-order polynomial defined by the following equation:

y=ax³+bx+c wherein a, b, and c are polynomial coefficients, which may be calculated for each base curve and power combination employing conventional algorithms, as will be understood by the skilled artisan.

The blends joining the various curves can be aspheric or spheric fillet curves, a fillet curve being a portion of a surface of revolution, the generatrix of which is a conic section, preferably an ellipsoid or spherical surface of revolution, more preferably spherical. Such a fillet can be used to join or smooth the transition between the curve in the marginal portion and the curve in the peripheral portion, either on the back or front surface.

It will be understood, that although FIG. 2 shows one embodiment of the invention, additional aspherical or spherical curves may be provided along the length of the lens. For example, as will be apparent to those skilled in the art, multiple front peripheral curves may be combined together to form the total periphery of the lens, preferably with tangential transitions between curves. Thus, the embodiment of FIG. 2 shows the minimum numbers of curves for the front surface according to the present invention.

Although one embodiment of the invention involves the combination of the above-described front surface with a back-surface multifocal, it is to be understood that the front surface described herein can also be used as a stand-alone front-surface multifocal which provides for both distance- and near-vision.

Fitting of a lens according to the invention may employ the trial lens method with fluorescein assessment, wherein the base curve radius of the first trial lens is chosen by measuring the corneal curvature and identifying the Flat K and the amount of corneal astigmatism. Preferably, the lenses of this invention may be provided with a base curve radius ($R_o$) from about 7.30 mm to 8.30 mm, generally in incremental steps of 0.05 mm or 0.10 mm. Outside diameters preferably range from about 8.2 mm to 10.5 mm, with the central optical zone (A) having a diameter preferably greater than the pupil diameter and less than 8.0.

A representative lens having a base curve radius of 7.3 mm and an outer diameter of 9.6 mm may be provided with the following posterior zones: a back central zone (A) having a diameter of 7.0 mm, a base curve radius of 7.3 mm and constituted by a segment of an ellipsoid having an eccentricity of 0.75; a back marginal zone (B) having a diameter of 9.0 mm, a peripheral radius of 5.7 mm and constituted by a segment of a hyperboloid having an eccentricity of 1.5 and an offset of –0.11; and a back peripheral zone having a peripheral radius of 6.6 mm and constituted by a segment of an ellipsoid having an eccentricity of 0.083 and an offset of –0.34.

This lens may be provided with the following anterior zones: a front central zone (D) constituted by a central anterior curve having a diameter of 6.0 mm and constituted by a segment of an ellipsoid having an eccentricity of 0.4; a front marginal zone (E) having a diameter of 8.1 mm and constituted by a third-order polynomial having coefficient values of a, b, and c of, respectively, 0.01, 0.10, and –0.01; and a spherical front peripheral zone (F) having a peripheral radius of 8.3 mm. Lenses with other parameters or curves can be provided by the skilled artisan The invention is not limited to the details of the illustrative embodiments. This invention may be embodied in other specific forms without departing from the essential attributes thereof. The present embodiments are therefore to be considered as illustrative and not restrictive.

What is claimed is:

1. A rigid-gas-permeable contact lens for simultaneous multifocal vision correction, which lens comprises:
   (a) a back surface comprising, in cross-section from the axial center to the edge of the lens, the following surface curves:
     (i) at least one curve within a back central zone for providing both near-vision and distance-vision correction;
     (ii) at least one curve within a back peripheral zone, for contributing to the fit of the lens;
     (iii) a curve within a back marginal zone, between a curve in the back central zone and a curve in the back peripheral zone, for contributing to near-vision correction, as part of a clinically effective central optical zone;
   wherein each of said curves are constituted by aspherical surfaces and wherein the axial lift of said curves within the back central optical zone and the back marginal zone increases toward the edge of the lens, and the axial lift of the curve within the back peripheral zone decreases toward the edge of the lens, and wherein the back central zone provides a correction for near-vision of between about 0.50 and about 2.00 Diopters; and (b) a front surface comprising, in cross-section extending from the axial center to the edge of the lens, the following surface curves:
  (i) within a front central zone, at least one curve for providing distance-vision and near-vision correction;
  (ii) within a front peripheral zone, at least one curve; and
  (iii) within a front marginal zone, between a curve in the front central zone and a curve in the front peripheral zone, a mid-peripheral curve for contributing to near-vision correction, as part of an effective central optical zone;
  wherein the front surface provides an additional power of about 0.25 to about 2.00 Diopters.

2. The lens of claim 1 wherein the back surface provides a near-vision correction of between about 1.0 to about 2.0 Diopters, and wherein the front surface provides a near-vision correction of about 0.25 to about 1.5 Diopters.

3. The lens of claim 1, wherein a blend between said curve in the back or front marginal zone and said curve in the back or front peripheral zone, respectively, is a conical fillet curve, the fillet curve being a portion of a surface of revolution.

4. The lens of claim 1, wherein the curves on the back surface of the lens are all conic sections.

5. The lens of claim 1, wherein said curve in the back central zone on the back surface of the lens comprises an ellipsoid surface of revolution.

6. The lens of claim 1, wherein said curve in the back marginal zone is a hyperboloid surface of revolution.

7. The lens of claim 1, wherein said curve in the back peripheral zone is an ellipsoidal surface of revolution.

8. The lens of claim 3, wherein said fillet curve is a spherical surface of revolution.

9. The lens of claim 1, wherein the back surface comprises a curve in the back central zone that is an ellipsoid surface of revolution, a curve in the back marginal zone that is a hyperboloid surface of revolution and a curve in the back peripheral zone that is an ellipsoidal surface of revolution.

10. The lens of claim 9, wherein the transition between a curve in the back marginal zone and a curve in the back peripheral zone is smoothed by a spherical fillet curve.

11. The lens of claim 1, wherein the curve in the front central zone is defined by a conic section.

12. The lens of claim 1, wherein the mid-peripheral curve is defined by a polynomial.

13. The lens of claim 1, wherein the front peripheral zone comprises a spherical curve.

14. The lens of claim 12, wherein the polynomial is a third-order or higher-order polynomial.

15. A multifocal lens comprising a back surface, a front surface, and an edge, wherein the front surface comprises, in cross-section, in the direction from the axial center to the edge of the lens, the following curves:
  (a) a curve in a front central zone for providing distance-vision and near-vision correction, which curve is defined by a conic section,
  (b) a mid-peripheral curve in a front marginal zone that contributes to near-vision correction, wherein the curve is defined by a polynomial that is steeper than a sphere and that provides plus power, and
  (c) at least one curve in a front peripheral zone that is spherical.

16. The lens of claim 15, wherein the transition between the mid-peripheral curve and the curve of the front peripheral zone is smoothed by a fillet curve that is a portion of a surface of revolution, the generatrix of which is a conic section.

17. The lens of claim 15, wherein the back surface provides a near-vision correction of between about 0.5 to about 2.0 Diopters, and wherein the front surface provides a near-vision correction of about 0.25 to about 2.0 Diopters.

18. The lens of claim 14, wherein the polynomial is defined by the following equation:

$$y=ax^3+bx+c$$

wherein a, b, and c are polynomial coefficients.

* * * * *